Aug. 17, 1926.
F. G. WHITTINGTON
SPEEDOMETER DRIVE CONNECTION
Filed March 25, 1922    2 Sheets-Sheet 2
1,596,643
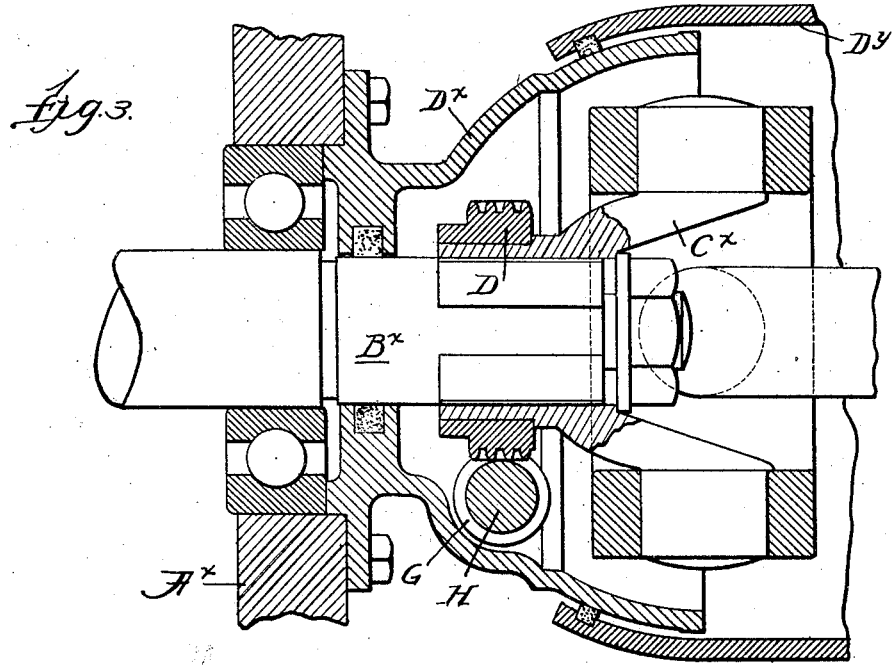
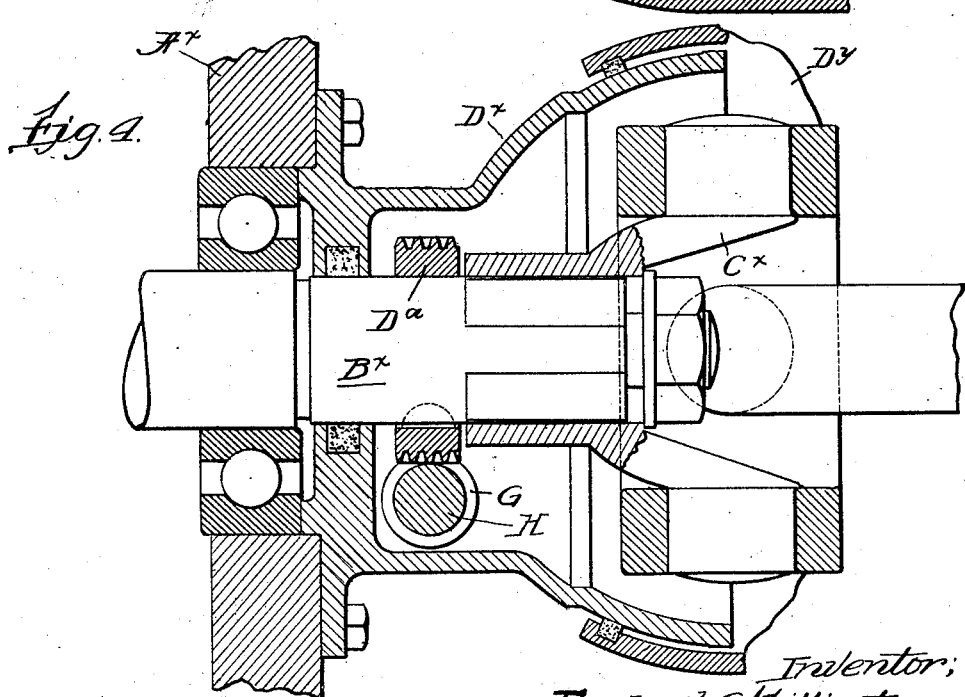

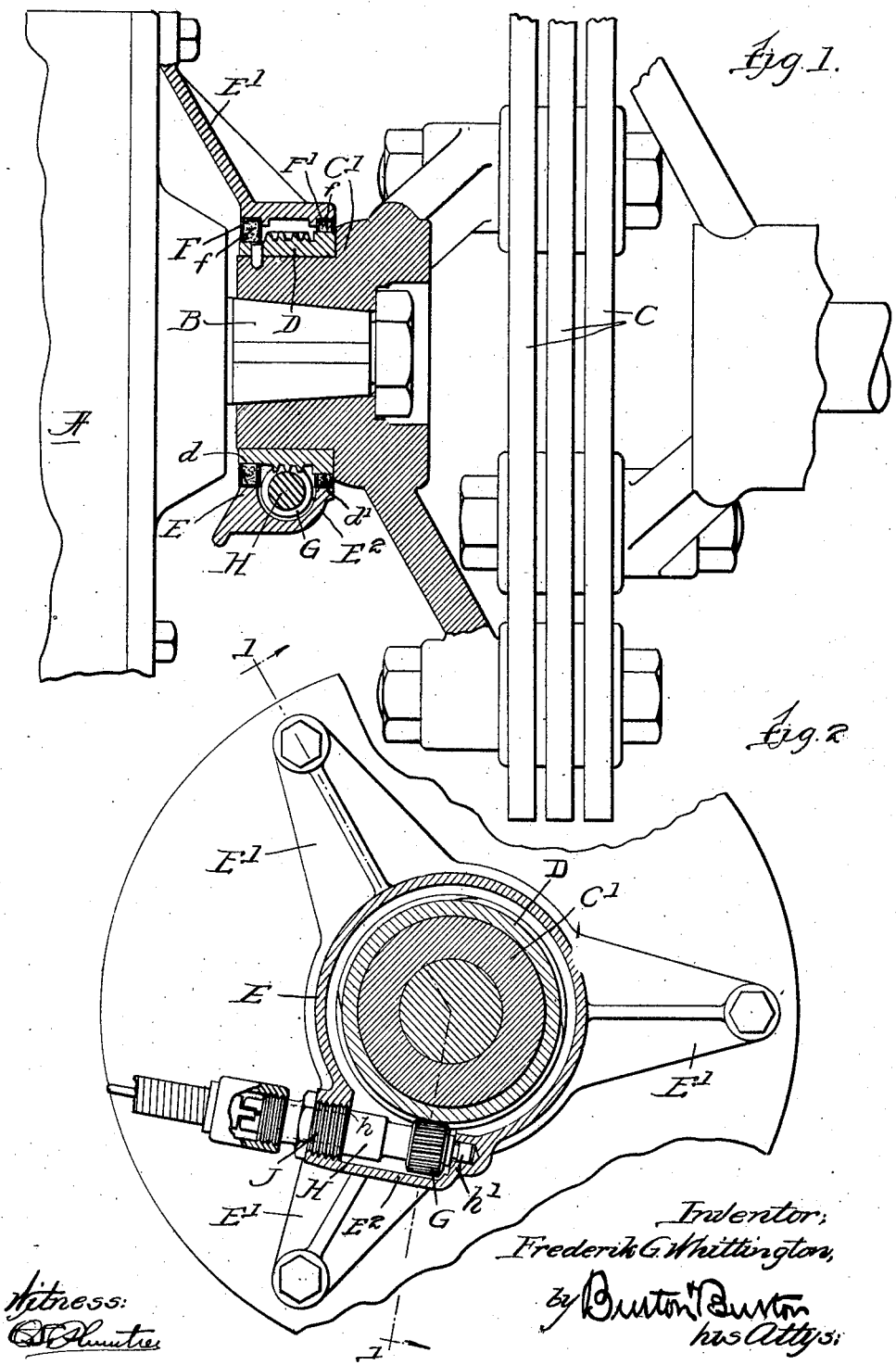

Patented Aug. 17, 1926.

1,596,643

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

SPEEDOMETER DRIVE CONNECTION.

Application filed March 25, 1922. Serial No. 546,602.

The purpose of this invention is to provide an improved construction for connecting with the driving mechanism of an automobile, a flexible shaft or the like for driving an indicating instrument, such as a speedometer or odometer. It consists in the elements and features of construction shown and described, as indicated in the claims.

In the drawings:—

Figure 1 is a partly sectional side elevation of a portion of the drive mechanism of an automobile proximate to and including a customary form of universal joint connection in the fore-and-aft-extending propeller shaft, section being made axially on the propeller shaft through the part thereon concerned in this invention.

Figure 2 is a section at the line, 2—2, on Figure 1.

Figure 3 is an axial section of a portion of a propeller shaft and its bearings and adjacent parts, corresponding to the parts shown in Figures 1 and 2, in which the universal joint is of a different form and is enclosed in a housing.

Figure 4 is a view similar to Figure 3, showing a slight modification.

In the drawings the transmission casing of an automobile is shown at A, the forward section of a fore-and-aft propeller shaft protruding therefrom is shown at B, and the universal coupling of the companion flange type is shown at C. On the hub, $C^1$, of the forward companion flange there is shown in Figures 1 and 2, a spiral gear, D, which as illustrated is an annulus fitted and keyed fast on said hub. E is a bracket having three arms, $E^1$, by which it is secured fast to the rear side of the transmission casing, A, and comprising as its center portion a housing for the gear, D, and for that purpose having at its opposite sides or ends annular bushings, F and $F^1$, adapted for holding packing shown at $f$, therein, said bushings and the packing which they contain making liquid-tight joints with the annular gear member at opposite sides of the gear-toothed periphery of the latter, as seen at $d$, $d^1$. The housing, E, is extended at one side of the gear chamber thereof, forming at $E^2$, a recess or supplemental housing chamber, which is apertured at one end for admission thereinto of a driven gear, the spiral or twist-toothed pinion, G, which is fast on a driven shaft, H, said shaft being provided with a journal bearing sleeve, J, screwed into the end aperture of the metal housing, $E^2$, which is interiorly threaded for that purpose. The shaft, H, is reduced in diameter at its outer end portion to form a shoulder at $h$, for stopping against the inner end of the sleeve, J. For stopping said shaft in the opposite direction and for further journaling it, its inner end beyond the pinion, G, is reduced in diameter, forming a pintle at $h^1$, for which journal bearing is provided in the housing axially aligned with the end aperture thereof in which the sleeve is screwed. The protruding end of the sleeve and the shaft, H, are adapted respectively for attaching a flexible shaft casing and the rotating member of the flexible shaft for driving a speedometer or the like.

In Figure 3 there is shown a modification of the construction above described in which the universal connection of the propeller shaft is of the familiar double fork type, adapted to be housed in. On the universal coupling member, $C^x$, there is shown mounted in the same manner as in Figures 1 and 2, a spiral gear annulus, D. In this form the forward member of the housing, $D^x$, which with its companion member, $D^y$, partly shown, houses the universal coupling, serves also as the housing for the driven gear, G, and its shaft, H, which may be understood as having the same sleeve bearing, J, as shown in the other forms, the entire unit, comprising said sleeve bearing shaft and pinion, being intruded into the housing and secured at the entrance, and the driven shaft being provided with a journal bearing at its opposite end in the housing, as in the form shown in Figures 1 and 2.

In Figure 4 there is shown a slight modification of the construction shown in Figure 3, consisting in mounting the driving gear, corresponding to the annulus, D, of the other form, and indicated as $D^a$, in Fig. 4, directly upon the propeller shaft, back of the hub of the universal joint coupling. In other respects the construction may be understood to be the same as in Figure 3.

I claim:—

1. In combination with an automobile driving mechanism comprising a transmission casing and a power-communicating shaft protruding rearwardly therefrom, said transmission casing having a bearing for said shaft constituting a closure for the casing at the emergence of the shaft therefrom, said shaft closing the bearing aperture through which it emerges, the shaft having a universal joint outside of the casing and spaced a short distance therefrom, a supplemental housing mounted exteriorly upon the transmission casing encompassing the portion of the shaft between its emergence from the casing and the universal joint thereof, a gear member mounted on the protruding portion of the shaft back of the universal joint and within said supplemental housing, a driven shaft journaled in said supplemental housing and a pinion thereon meshing with said gear, said driven shaft protruding from the supplemental housing and adapted for connection of a flexible driving shaft.

2. In combination with an automotive vehicle driving mechanism comprising a fore-and-aft extending power-communicating shaft, a casing from which it protrudes having a bearing for said shaft constituting a closure for the casing at the emergence of the shaft therefrom, said shaft having a universal joint outside the casing for accommodating the distortion of the frame structure in travel; a gear on said shaft between said journal bearing and the universal joint member proximate thereto; a housing for said gear removably mounted on the frame structure adjacent to and independent of said journal bearing, which constitutes the closure of the casing, said housing having an aperture positioned and dimensioned for admitting a driven gear for meshing with the first mentioned gear, said driven gear and its shaft and a sleeve journal bearing for said driven shaft intruded endwise through said aperture, the sleeve being made fast to the housing thereat with the end of the sleeve and the end of the driven shaft exteriorly accessible for attachment of a shaft and casing.

3. In the construction defined in claim 1, foregoing, the first mentioned gear being fast on the universal joint member which is proximate the journal bearing which constitutes the casing closure.

4. In the construction defined in claim 1, foregoing, the universal joint member having a hub by which it is secured to the shaft, and the gear being an annulus encompassing and rigid with said hub.

In testimony whereof, I have hereunto set my hand at Chicago, Illinois, this 21st day of March, 1922.

FREDERIK G. WHITTINGTON.